United States Patent
Barrick et al.

(10) Patent No.: US 7,688,251 B2
(45) Date of Patent: Mar. 30, 2010

(54) SYSTEMS AND METHODS FOR MONITORING RIVER FLOW PARAMETERS USING A VHF/UHF RADAR STATION

(75) Inventors: Donald E. Barrick, Redwood City, CA (US); Calvin C. Teague, Los Altos, CA (US); Peter M. Lilleboe, San Jose, CA (US)

(73) Assignee: CODAR Ocean Sensors, Ltd, Mountain View, CA (US)

( * ) Notice: Subject to any disclaimer, the term of this patent is extended or adjusted under 35 U.S.C. 154(b) by 0 days.

(21) Appl. No.: 12/025,986

(22) Filed: Feb. 5, 2008

(65) Prior Publication Data

US 2009/0195437 A1    Aug. 6, 2009

(51) Int. Cl.
*G01S 13/08* (2006.01)

(52) U.S. Cl. .................. 342/104; 342/113; 342/195

(58) Field of Classification Search ............... 342/113, 342/104
See application file for complete search history.

(56) References Cited

U.S. PATENT DOCUMENTS

| | | | |
|---|---|---|---|
| 4,172,225 A | | 10/1979 | Woldseth et al. ............ 250/306 |
| 5,361,072 A | * | 11/1994 | Barrick et al. .............. 342/133 |
| 5,520,969 A | * | 5/1996 | Nishizato et al. .............. 427/8 |
| 5,990,834 A | | 11/1999 | Barrick et al. .............. 342/418 |
| 6,586,748 B1 | | 7/2003 | Lloyd et al. ................. 250/302 |
| 6,590,523 B2 | | 7/2003 | Barrick et al. .............. 342/191 |
| 6,774,837 B2 | | 8/2004 | Barrick et al. ................ 342/26 |
| 6,844,849 B1 | * | 1/2005 | Barrick et al. .............. 342/372 |
| 6,856,276 B2 | | 2/2005 | Barrick et al. ................ 342/59 |
| 6,862,922 B2 | | 3/2005 | Barrick et al. ................ 73/105 |
| 2002/0000944 A1 | * | 1/2002 | Sabet et al. ................. 343/770 |
| 2003/0071751 A1 | * | 4/2003 | Barrick et al. ............. 342/104 |
| 2003/0236639 A1 | * | 12/2003 | Curry ......................... 702/45 |
| 2004/0008020 A1 | * | 1/2004 | Sullivan et al. .......... 324/76.19 |

OTHER PUBLICATIONS

Ma et al., "UHF surface current radar hardware system design," *IEEE Microwave and Wireless Components Letters*, 15(12):904-906, 2005.
Plant et al., "Measurement of river surface currents with coherent microwave systems," *IEEE Trans. Geoscience & Remote Sensing*, 43(6):1242-1257, 2005.

* cited by examiner

*Primary Examiner*—Thomas H Tarcza
*Assistant Examiner*—Timothy A Brainard
(74) *Attorney, Agent, or Firm*—Weaver Austin Villeneuve Sampson LLP (57) ABSTRACT

Systems and methods are described for monitoring the surface flow velocity and volume discharge of rivers and channels using a VHF/UHF radar located in operative relationship with a riverbank. This frequency region allows precise estimation and removal of the Bragg wave velocity; it also is matched to the short wind-wave roughness periods existing on river surfaces so that operation is possible nearly all the time. Methods of bearing determination are also disclosed. Up/downriver surface velocity profiles vs. distance across the river may be constructed from maps of the radial velocity component from a single radar at thousands of points within the radar's coverage. Methods to compensate for Doppler aliasing under high flow conditions are also shown.

18 Claims, 7 Drawing Sheets

SYSTEMS AND METHODS FOR MONITORING RIVER FLOW PARAMETERS USING A VHF/UHF RADAR STATION

BACKGROUND OF THE INVENTION

1. Field of the Invention

The present invention relates generally to radars and, more particularly, to systems and methods for monitoring river flow parameters using a VHF/UHF radar station.

2. Description of Related Art

The monitoring of river flow, and in particular the volume discharge past a point as a function of time, is a well established technology dating back over a century. There are thousands of stream gauging systems in use in the U.S. at present. Many citizens depend on the free-access availability of river discharge for decisions in agriculture, flood control/monitoring, boat operations, etc. Unfortunately, conventional methods all have the disadvantage of using sensors placed in the water, and hence their lifetimes are limited and maintenance costs are high. As such, the need for "non-contact" replacements has been articulated by many, including the U.S. Geological Survey, state agencies, etc. Obtaining a velocity profile across the river is now considered an acceptable input data set to the process of estimating the total river discharge.

High frequency (HF) radars have found extensive application for mapping currents on the ocean surface. Part of the reason for this is that their long wavelength signals, when scattered from the dominant sea-surface waves, lead to a very simple, robust physical and phenomenological interpretation that is not possible with much more widely utilized microwave radars. Currents or surface flow patterns give rise to Doppler shifts from Bragg-scattering waves, i.e., those half the radar wavelength moving toward and away from the radar. Currents transporting the Bragg waves impart an additional Doppler shift from that due to the known wave-induced velocity, and the former may be extracted based on knowledge of the latter. Two or more radars on the coast viewing the same point on the sea allow a total horizontal velocity vector to be constructed at each map point from the radials. U.S. Pat. Nos. 4,172,255 and 5,361,072, describe the technology of HF radar coastal current mapping radars, while U.S. Pat. No. 5,990,834 describes how bearing for these current-mapping radars are determined using highly compact antennas. HF radars viewing a river surface, however, are not suitable because the long Bragg waves corresponding to HF wavelengths are not present on smaller-scale rivers and channels.

Microwave radars whose wavelengths span a couple centimeters have been tried for river velocity profiling. Doppler versions that also do precise range measurement have the disadvantage that they are expensive and therefore less attractive for widespread use. Another disadvantage is the complex scattering mechanism due to their very short wavelengths; this leads to inaccuracies in water velocity extraction, because a simple Bragg-wave dispersion relation that works so well at HF on the sea and ultra high frequency (UHF) on rivers is not applicable; less accurate empirical rules must be established. On the other hand, forming narrow beams with their parabolic dish antennas is a well understood concept. An example of use of microwave radars for river monitoring may be found in "Measurement of River Surface Currents with Coherent Microwave Systems," Plant et al., IEEE Trans. Geoscience & Remote Sensing, Vol. 43, No. 6, pp. 1242-1257, 2005.

To achieve the same narrow beamwidth at UHF that microwave radars possess would demand an antenna tens of meters in size. This presents a significant obstacle to acceptance, both from structural size and cost standpoints. HF sea-current mapping radars with compact antennas in common use nowadays have gotten around the large size limitation by trading high directive gain for the sake of a broad field of view (up to 360°). U.S. Pat. No. 5,361,072 describes a direction-finding radar system comprised of compact, co-located with crossed-loop and monopole antennas.

An example of a UHF river-velocity monitoring radar is described in "UHF Surface Current Radar Hardware System Design," Ma et al., IEEE Microwave and Wireless Components Letters, Vol. 15, No. 12, pp. 904-906, 2005. This system operates at 300 MHz and uses Yagi antennas on a riverbank. However, this Chinese system has two major limitations. First, Yagi antennas have quite broad beamwidth. When used by themselves in a conventional arrangement, they produce velocity profiles or maps with seriously degraded bearing resolution, leading to biases. Second, the system uses a CW (continuous-wave or non-pulsed signal format), which stresses the dynamic range of the receiver. To handle weak signals, the Ma et al. discuss the need for separate antennas for transmit and receive, with an interference-reducing fence between them. This constitutes a severe handicap to robust operation, because their antenna arrangement is no longer compact nor is it a low-cost system.

Thus, in order to realize the many advantages a UHF river-monitoring radar offers, the inventors hereof have recognized a number of obstacles to be overcome. The present invention solves these and other problems by providing a cost-effective VHF/UHF approach for real-time river flow and discharge monitoring.

BRIEF SUMMARY OF THE INVENTION

The present invention provides systems and methods for monitoring river flow parameters using a VHF/UHF radar station. In one embodiment, a system for monitoring river flow parameters comprises a radar station having at least one antenna array located in operative relationship with a riverbank, at least one receive channel coupled to the at least one antenna array, a direction finding module coupled to the at least one receive channel, a de-aliasing module coupled to the direction finding module, and at least one module selected from the group consisting of a profiling module coupled to the de-aliasing module and operable to calculate a profile of downriver surface flow as a function of distance across a river, and an indexing module coupled to the de-aliasing block and operable to employ a subset of surface velocities measured by the radar station to estimate a river discharge In another embodiment, an method for monitoring river flow parameters comprises receiving data from a radar station located in operative relationship with a riverbank, pre-processing the received data, applying a direction finding (DF) algorithm to the pre-processed data, applying a de-aliasing algorithm to the DF data, and performing at least one of the following steps: calculating a profile of downriver surface flow as a function of distance across a river; and employing a subset of surface velocities measured by the radar station to estimate a river discharge. In yet another embodiment, a computer readable medium having a computer program recorded thereon causes a computer to perform one or more of the aforementioned the steps.

The present invention provides a VHF/UHF radar system and method for determining river and/or stream flow based on backscatter from the surface waves. The Doppler shift of the radiated frequency provides a measure of the radial velocity at each point on the river surface that is seen by the radar. This radial velocity map and its information may then be employed to estimate the volume discharge, which is an important quantity of interest to most users. The radar station may be located on the river bank, thus overcoming certain disadvantages of conventional river gauging methodologies that rely upon instruments being positioned in the water. It also provides a more robust, cost-effective solution than microwave radars.

It is an object of the present invention to provide a system and method to employ the VHF/UHF frequency band (instead of HF or microwave) to matched to the roughness found on river surfaces. In one embodiment frequencies between approximately 200 MHz and 3 GHz are used. VHF/UHF also allows the use of the Bragg Doppler dispersion relation to remove wave velocities from the current or flow velocity, which cannot be done at microwave frequencies.

It is another object of the present invention to provide a system and method for overcoming the large antenna sizes that are normally required at UHF to form and scan narrow beams. This object may be achieved, for example, by employing a highly effective direction-finding (DF) algorithm rather than conventional beam forming (BF) with YAGI antennas, thus reducing the size, cost, and complexity normally associated with Doppler radars.

It is yet another object of the present invention to provide a system and method for fitting a mathematical model to the radial-map velocity data from the UHF radar on the river bank. Owing to the unique DF method disclosed above, this radial velocity map is a rich source of redundant data, allowing accurate profiles of river velocity with distance from bank to bank.

A further object of the present invention is to overcome a limitation posed by Doppler aliasing that happens when river flows are strong, which would otherwise restrict the ability to extract radial velocity in such stream flow situations.

It is yet a further object of the present invention to provide a system and method for calculating river volume discharge when velocity cannot be measured continuously from one side of the river to the other. Such techniques have been developed for other sensors (such as acoustic Doppler profilers), and are called index methods, based on developing a rating curve from empirical calibration at the selected river site.

The term "coupled" is defined as connected, although not necessarily directly, and not necessarily mechanically.

The terms "a" and "an" are defined as one or more unless this disclosure explicitly requires otherwise.

The terms "substantially," "approximately," "about," and variations thereof are defined as being largely but not necessarily wholly what is specified, as understood by a person of ordinary skill in the art. In one non-limiting embodiment, the term substantially refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

BRIEF DESCRIPTION OF THE SEVERAL VIEWS OF THE DRAWINGS

For a more complete understanding of the present invention, reference is now made to the following drawings, in which.

DETAILED DESCRIPTION OF THE INVENTION

In the following detailed description, reference is made to the accompanying drawings that illustrate exemplary embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1A:
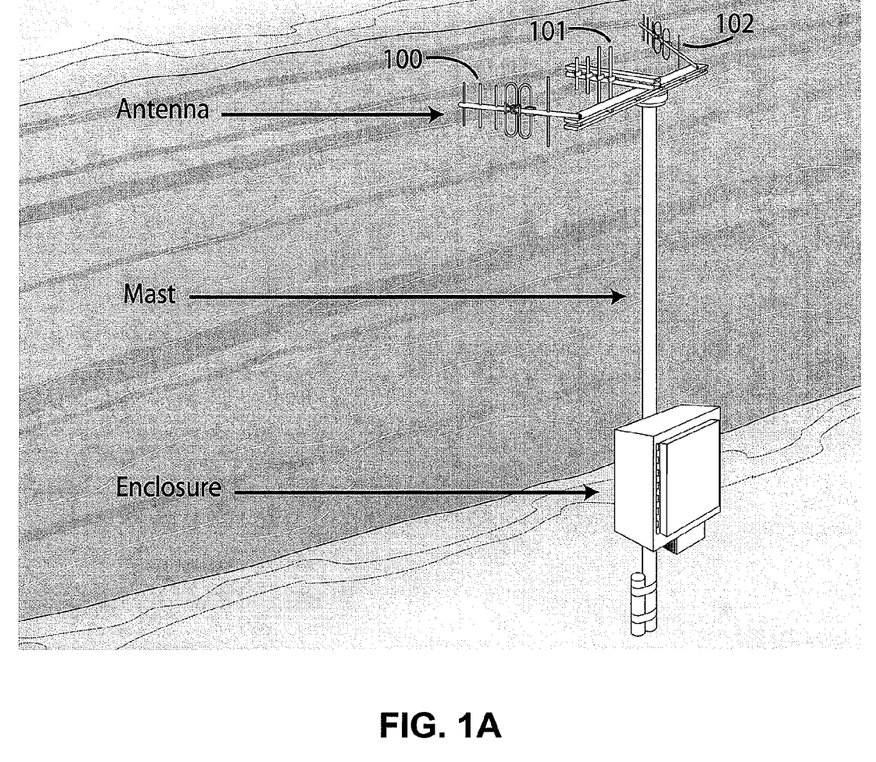
FIG. 1A shows a VHF/UHF radar station according to one embodiment of the present invention.

Turning now to FIG. 1A, a VHF/UHF radar station is depicted according to one embodiment of the present invention. Three directional Yagi-Uda antenna arrays (YAGIs) 100-102 and an enclosure may each be coupled to a mast located in operative relationship with a riverbank. Antenna arrays 100-102 provide greater sensitivity by virtue of their gain, and hence greater signal-to-noise ratio (SNR) than the omni-directional antennas used at HF. The VHF/UHF radar station may use pulsing and gating in order to avoid transmitting while receiving, and thus eliminating the need for separate transmit and receive antennas, along with a method to isolate them from each other so they do not mutually interfere.

Also, a direction finding (DF) algorithm may be used to provide narrow beamwidths desirable for good directional resolution. In a preferred embodiment, YAGI arrays 100-102 are spaced approximately one-half wavelength apart and the two end arrays 100 and 102 are canted at about ±30° in bearing with respect to the center element 101. However, as a person of ordinary skill in the art will immediately recognize in light of this disclosure, other configurations may be a appropriate depending upon the particular application.

Figure 1B:
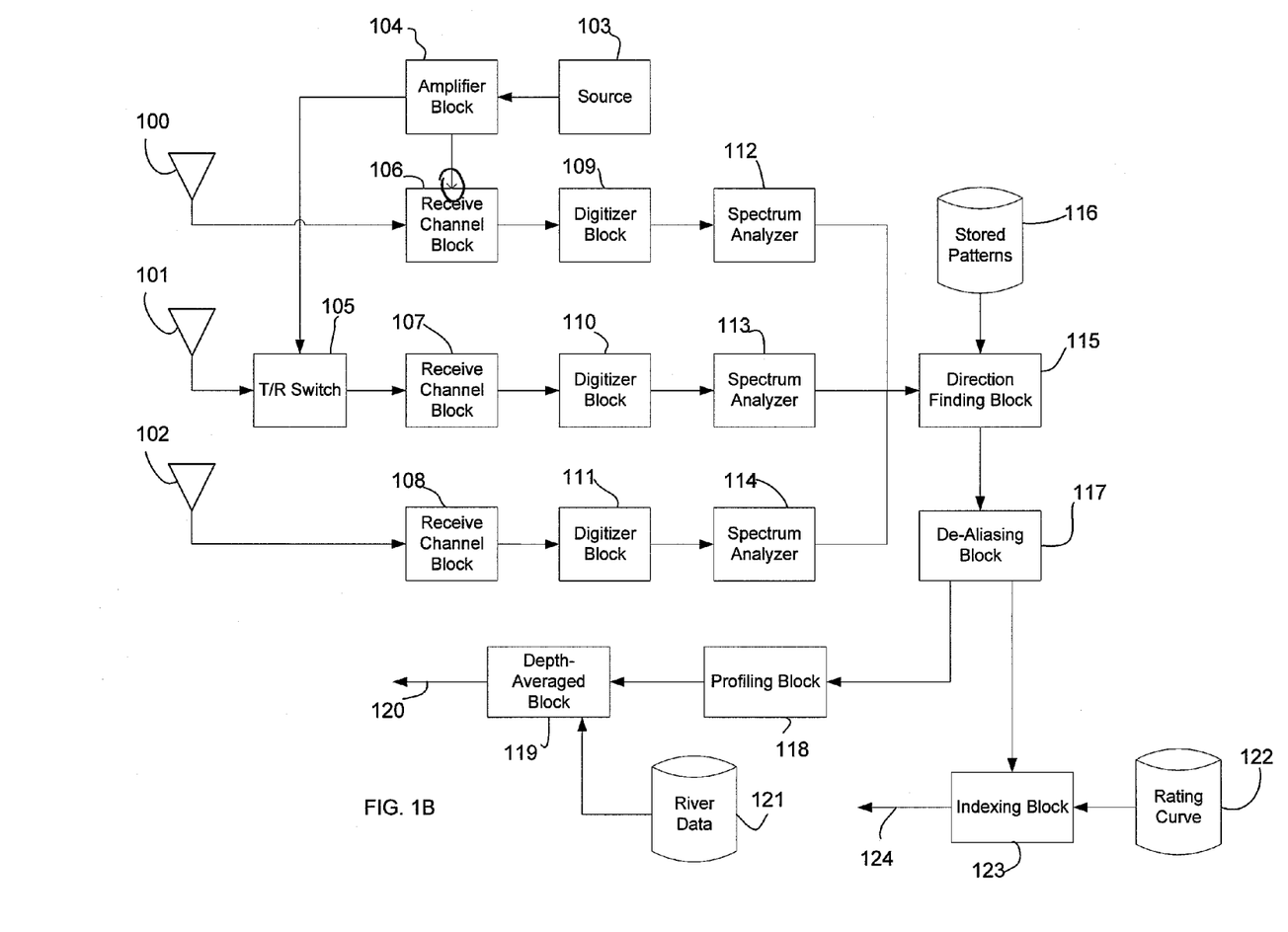
FIG. 1B is a block diagram of a signal processing system according to another embodiment of the present invention.

FIG. 1B shows a block diagram of a signal processing system according to another embodiment of the present invention. One or more elements of this system may be placed, for example, within the enclosure shown in FIG. 1A. A signal from source 103 is radiated through the center YAGI array 101, after being amplified in 104 and passing through the transmit/receive (T/R) switch 105. The array is preferably short enough to provide has greater beamwidth so that its radiated energy floods the river region to be viewed. Signals are scattered from the wave roughness on the water surface, and only those wave spectral components that are precisely half the radar wavelength can scatter back toward the radar. This phenomenon is called Bragg scatter. Both waves moving toward and away from the radar are observed, and the Doppler shift induced by their radial velocities are resolved by Fourier spectral analysis. At UHF frequencies and below, these spectral echoes can then be separated from each other. Underlying currents transporting these Bragg waves add an extra Doppler shift that is measured by the radar. At higher frequencies than UHF (i.e., microwave), these effects become mixed or overlain spectrally in such a way that their separation is no longer straightforward, hence lowering the accuracy and utility.

In one embodiment of the invention, backscattered signals are received through all three YAGI antennas 100-102. These signals pass through three identical receive channels 106-108. When processed by channels 106-108, the received signals are downconverted in frequency and demodulated by mixing with a replica of the swept-frequency transmit waveform. This process is described in U.S. Pat. No. 5,361,072, which is hereby incorporated by reference herein. Preferably, the desired information may be contained within a bandwidth of approximately 2 kHz and digitized by audio-band analog-to-digital converters 109-111.

The resulting digital data streams pass through blocks or modules 112-114, where they are spectrally analyzed. In one embodiment, the spectral analysis comprises a double-FFT (fast Fourier transform). A first FFT resolves the range from the radar to the radar scattering cell on the river surface; the echoes within this cell fall inside of a circular annulus. A second FFT creates the Doppler spectrum, whose frequencies are related to the velocity. Again, this processing is described in U.S. Pat. No. 5,361,072.

Unlike in microwave implementations, the Doppler shift for each spectral bin of the backscatter echo is related to the radial current velocity in a precise manner. Under weaker flow conditions, this relationship is given by:

$$v_r^\pm = \frac{\lambda f_D^\pm}{2} \pm \sqrt{\frac{g\lambda}{4\pi}}, \quad \text{Eq. (1)}$$

where $f_D^\pm$ is the Doppler shift of the echo bin on the positive side (upper sign) and/or negative side (lower sign) of the zero-Doppler position (Doppler shift measured in Hz). There is redundant information from these two sidebands, so that either or both can contain the complete velocity pattern. The radial velocity corresponding to these Doppler shifts, $v_r^\pm$, is taken as pointing toward the radar when positive, and given in meters/second. The radar wavelength $\lambda$ is known, and g is the acceleration of gravity.

Figure 2:
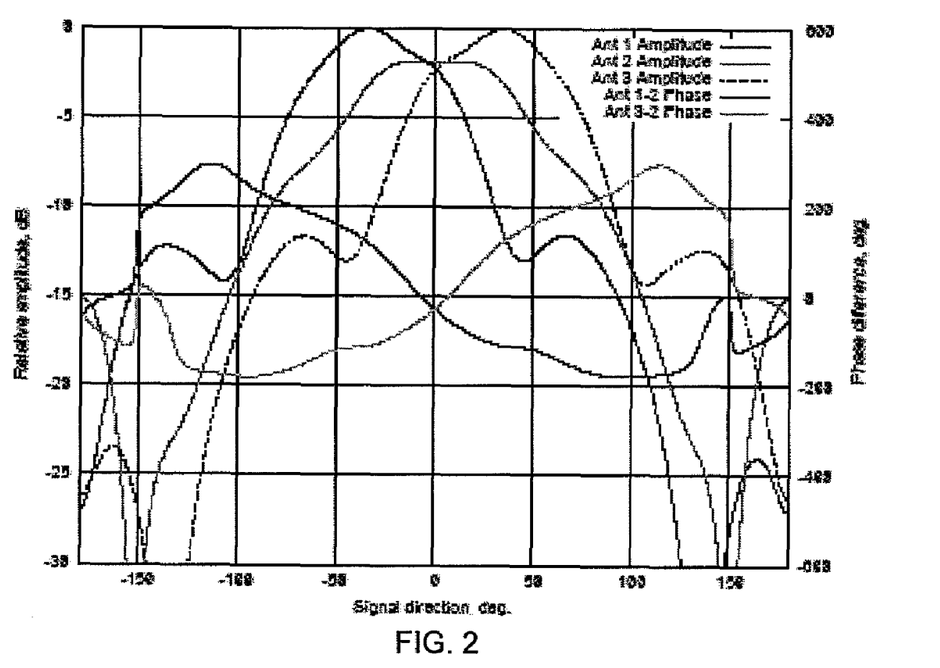
FIG. 2 is a graph of amplitude and phase patterns predicted for a YAGI antenna system at UHF according to another embodiment of the present invention.

The digital processing of block or module 115 applies a direction finding (DF) algorithm to the data streams from the three antennas, for each of the radial velocity bins obtained based on Eq. (1). An exemplary DF algorithm determines whether the best fit to the data is obtained from a single-angle or a dual-angle bearing solution at each radial velocity, as described in U.S. Pat. No. 5,990,834 hereby incorporated by reference herein. This step realizes the high gain and SNR of the YAGIs while achieving resolutions of approximately 1° in bearing angle. Part of the application of the DF algorithm requires accurate antenna patterns (including both amplitude and phase). This may be provided by measuring (calibrating) the antennas with a transponder circling through the field of view over the river. Alternately, a precisely calculated antenna patterns based on the specific YAGI antenna design and array geometry. Stored patterns 116 are inputted into DF block or module 115 and used in the bearing calculations. FIG. 2 shows amplitude and phase patterns predicted for a YAGI antenna system at UHF according to another embodiment of the present invention.

Figure 3:
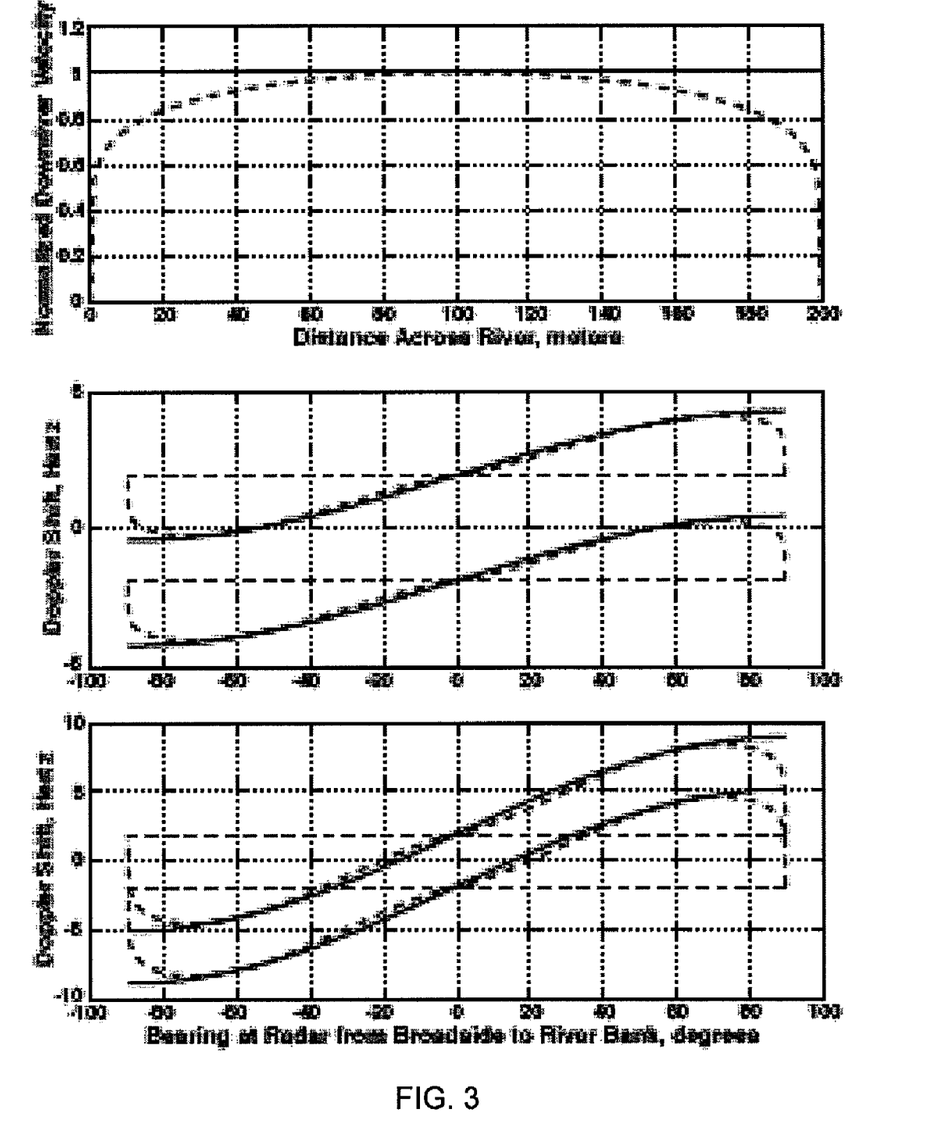
FIG. 3 shows curves for radial velocity vs. bearing angle at the radar that occur under differing flow velocities used to describe certain embodiments of the present invention.

The above methodology is particularly applicable if the current or stream flow is weak. The division of weak from strong occurs when the first term on the right side of Eq. (1) is equal to or greater than the second term. When this happens, the Dopplers for the desired flow velocities are greater than those for the known Bragg wave velocities (last term), and the region of undesired overlap is referred to as "aliased." FIG. 3 is illustrates the Doppler aliasing that occurs with strong river flows at UHF; e.g., at 350 MHz (in this case). The uppermost panel shows two possible example river velocity profiles. These represent the downriver surface velocity profile as a function of distance across a 200-m wide straight channel. These curves are normalized so that they have maxima of 1. The solid curve assumes a constant flow that does not vary across the channel. The dashed curve is a more realistic example profile that reaches unity in the middle of the channel but drops to zero at both stream-bank edges.

The middle panel of FIG. 3 takes as an example a maximum flow velocity of 1 m/s. That is, the normalized value of unity velocity in the upper panel represents 1 m/s. Two groupings of curves are plotted in the middle panel. These are the Doppler shifts, $f_D^\pm$, seen as a function of bearing angle viewing from upstream along the bank to downstream; i.e., +90° to −90°. The solid curves for Doppler correspond to the constant profile of the upper panel, and the dashed curves represent the profile that drops to zero at the banks. The upper two curves correspond to the upper sign, representing the positive Doppler echo region, and the lower two curves go with the lower sign, from the negative Doppler region. These two curves are centered on the green curve, that represents the second term of the prior equation, coming from the Bragg waves' inherent phase velocity, which is constant vs. angle. The two sets of curves are almost completely separated from each other (in other words, a horizontal line drawn across the plots may intersect one set of curves, but not the other. This is the "weak flow" case, and there is no aliasing problem for this maximum flow velocity. One does not need to employ "dealiasing" in this situation, or for flow velocities weaker than this.

If maximum flow increases to 3 m/s, following the normalized profiles of the upper panel of FIG. 3, then the lowest panel shows the echo Doppler relations vs. bearing angle. The situation is now severely aliased. Points measured by the radar, after DF bearing determination are clustered around the red curves. If one picks a given radial flow velocity (corresponding to a given Doppler shift on the vertical axis), the horizontal line drawn across the graph passes through two bearing regions. These two regions correspond to the ± signs representing the two overlapping Bragg spectral regions. A horizontal line should only pass through one. Hence, one cannot relate radial flow velocity uniquely to a single bearing, as can be done with the un-aliased middle panel. This is especially severe in the mid-region between the two green Bragg-line velocities, but is also true for a significant span outside of this region.

Accordingly, when the current or stream flow is strong, aliased regions may be separated using the procedure embodied in de-aliasing block or module 117. By recognizing the underlying physics of the Bragg scatter that leads to the output of DF block 115 to cluster as shown on the lower panel of FIG. 3, one embodiment of the present invention resolves and removes the ambiguity. For example, based on this knowledge and manner of organizing the Doppler-bearing solutions revealed herein, a dealiasing algorithm is applied to separate the two vertical regions, after which the aliasing is removed. One illustrative way to do this is to use a two-peak function to fit to the Doppler data within specified bearing bins. For example, within an angle sector from about 18° to 22°, a two-peak model may be constructed to fit all of the Doppler data points. The lower peak will then go with the negative sign of the preceding equation and the upper peak goes with the positive sign, and the ambiguity is removed.

Figure 4:
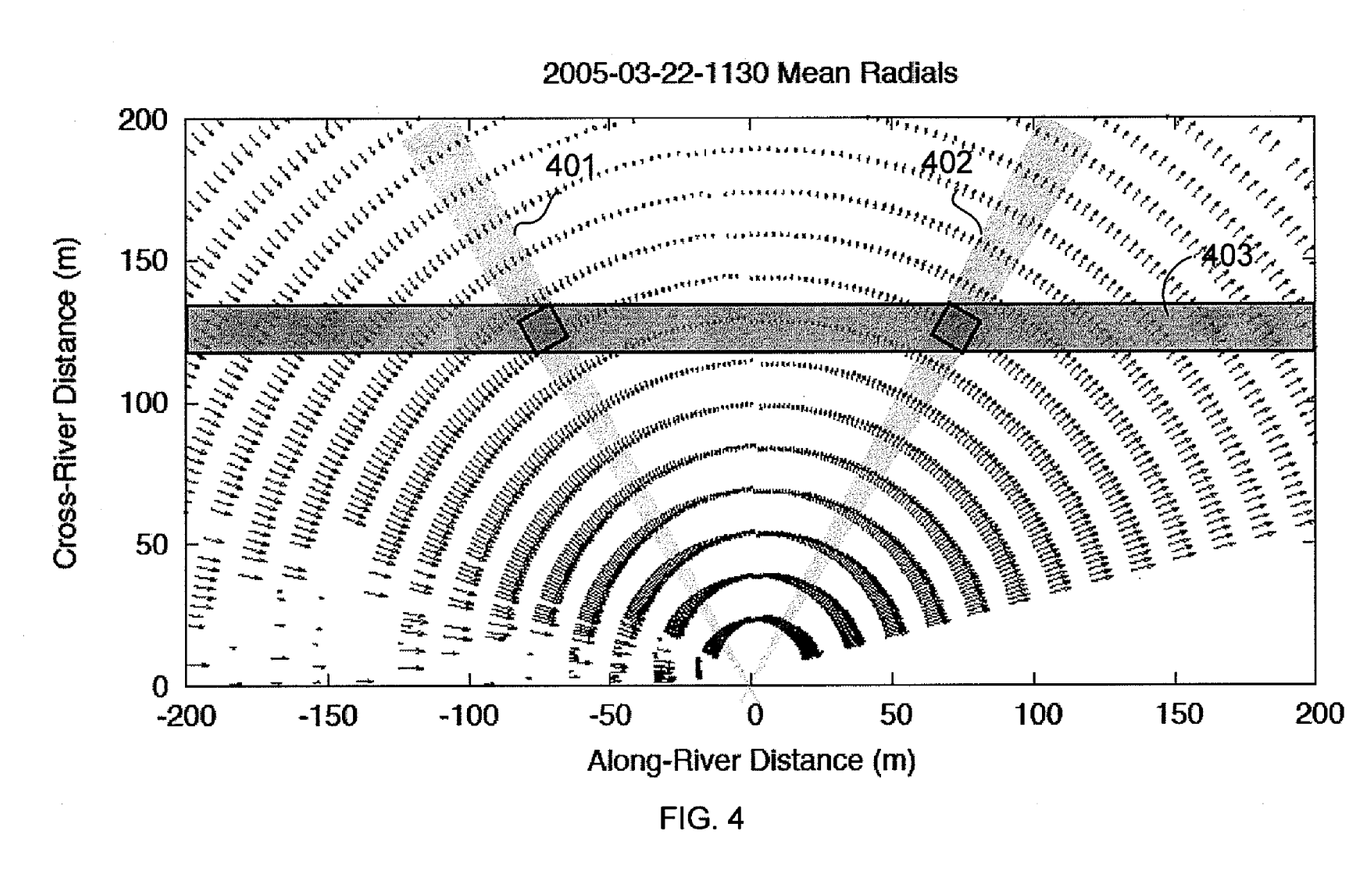
FIG. 4 is a map of radial flow velocities on a river surface according to one embodiment of the present invention.

At this point in the signal processing, the Doppler/Bragg equation has been applied after de-aliasing, and a radial velocity map of flow on the river surface has been constructed. An example of such a radial velocity map is shown in FIG. 4. In this figure of actual radial velocities measured over a 15-minute period using the embodiments disclosed herein. The vertical axis and dimensions represent the distance across the river, from the lower bank to the upper bank 200 meters away. The horizontal axis is the distance along the river. Normally the river banks are sufficiently parallel over short distances so that a depiction such as this is realistic.

One preferred embodiment that leads to river volume discharge starts with a profile of downriver surface flow as a function of distance across the river, which is calculated in block or module 118 of FIG. 1. Two exemplary techniques for deriving a cross-river profile are described below, although a person of ordinary skill in the art will readily recognize in light of this disclosure that other techniques may be similarly applicable.

In a first embodiment, two artificial beams 401 and 402 are formed at a selected angle, straddling the cross river direction as shown in FIG. 4. From the two radial velocities at a given range within the two beams, the downriver and the cross river velocity may be derived trigonometrically. This downriver component is then used at that particular distance from the near bank. The process is repeated at each range, until a profile is constructed. Assumed in this process is that the flow does not vary with distance up/down-river over these spatial scales. Many beams straddling the cross river direction can be created to give redundant estimates of the downriver flow, besides the two shown, because of the large fan of radial velocity information measured by the radar. These estimates of the same information can be averaged to provide more robust profile.

In a second embodiment, bands 403 parallel to the banks are created as shown in FIG. 4. All of the radial velocities falling in this band are collected, and become the data vector for a least-squares fitting process. The model to be fitted may include a downriver and cross river flow; i.e., two pieces of information to be derived from many radial velocities. This becomes an over-determined linear least-squares problem that is solved by subroutine calls available in most modern commercial computational packages. Additional information may be derived, if so desired, in this least-squares fitting process by including more parameters in the model. For example, one may also allow the downriver and cross river flows to vary linearly, quadratically, etc. vs. downriver distance, in addition to the constant term implied by the non-variation with downriver distance. The additional parameters describing this more complex flow may then be derived from the radial velocity data vector within this band. Thus, the assumption of no variation with distance along the river is eliminated.

In additional or alternative embodiments, other variations information may be extracted from radial velocity maps such as, for example, root mean square (RMS) errors, confidence limits, and other measures of uncertainty in the velocity profile. Derivation of these data covariances is part of linear least-squares model fitting, which is accomplished by matrix operations. These methods have advantageous application to river velocity profiling.

Figure 5:
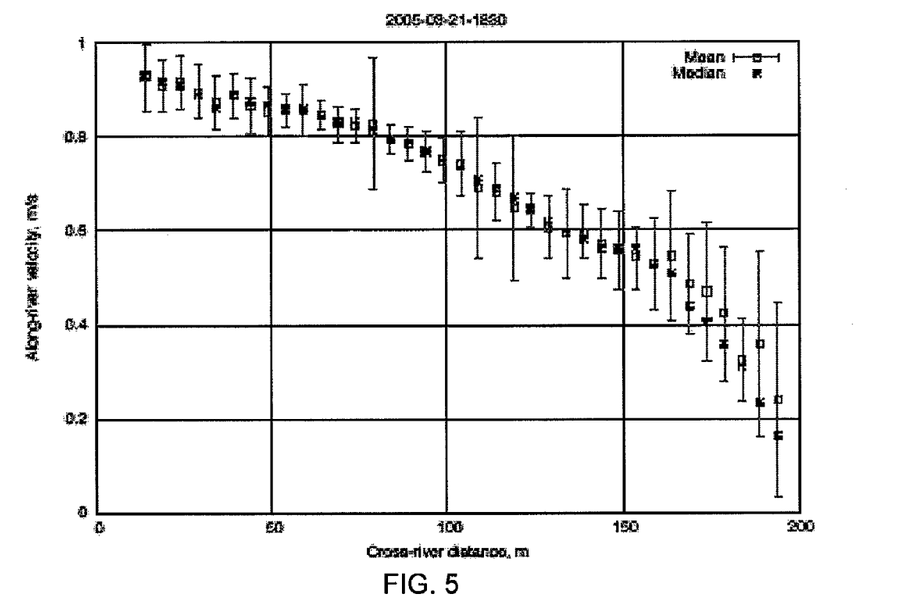
FIG. 5 is a profile of down-river flow as a function of distance across the river according to another embodiment of the present invention.

After one of more of the foregoing steps have been applied at block 118, a profile of downriver surface velocities may be obtained. An example actually measured and extracted in the above manner is shown in FIG. 5, based on the radial velocity map of FIG. 4. This example profile of velocity with cross river distance also includes the RMS uncertainties shown as the error bars on the data points defining the downriver velocity profile.

A depth-averaged flow may be obtained by multiplying the surface flow by about 0.85. In block or module 119, the depth-averaged flow is calculated at each point of the profile across the river. The shape of the river bed profile and the height of the river with respect to a reference datum ("river stage") are stored in database 121 and inputted to 119. These are used to calculate the cross sectional area of water across the river. When each water column of this cross-sectional profile is multiplied by the depth-averaged flow, the sum or integral of these products gives the desired volume of water passing this point, in cubic meters per second. The latter is referred to as river discharge 120.

Under certain circumstances, velocity profiles from the radar do not span the entire river width. In these cases, an indexing method applied by block or module 123 may employ a subset of the surface velocities that the radar station can measure. Index-based discharge calculations typically require site-specific calibrations. These may involve making velocity profiles with cross-river distance and depth over a 1-2 day period using independent means. For example, boat-deployed velocity sensors may be lowered and raised, or boat-mounted vertical acoustic Doppler profilers measure the current vs. depth as the boat traverses the river width. From these independent measurements and knowledge of the bottom profile, discharge is independently calculated. This is then plotted alongside the VHF/UHF (or other index sensor) velocities. The empirical relationship between the two is called the "rating curve." Two exemplary techniques for deriving the discharge using available VHF/UHF radar velocity data are described below, although a person of ordinary skill in the art will readily recognize in light of this disclosure that other techniques may be similarly applicable.

In a first embodiment, the slope of the curves shown in FIG. 4 at 0° bearing; i.e., looking directly offshore from the radar on the river bank is determined. This slope has proven to be a very sensitive indicator of discharge. Particularly, the higher the slope, the greater the discharge. The exact relationship is obtained from the pre-calibrated rating curve stored in 122, and applied in block 123. The resulting output 124 is the desired discharge.

In a second embodiment, a velocity profile or average only over a fixed portion of the river is employed. This portion may be empirically selected to yield velocity data. For example, in a 200-m wide river, the section between 40 m and 120 m yields a robust, reliable velocity average that compared well with "rating-curve" discharge calibrations. A site-specific calibration may produce a rating curve that is stored in 122 and applied by block 123 to yield discharge 124.

Figure 6:
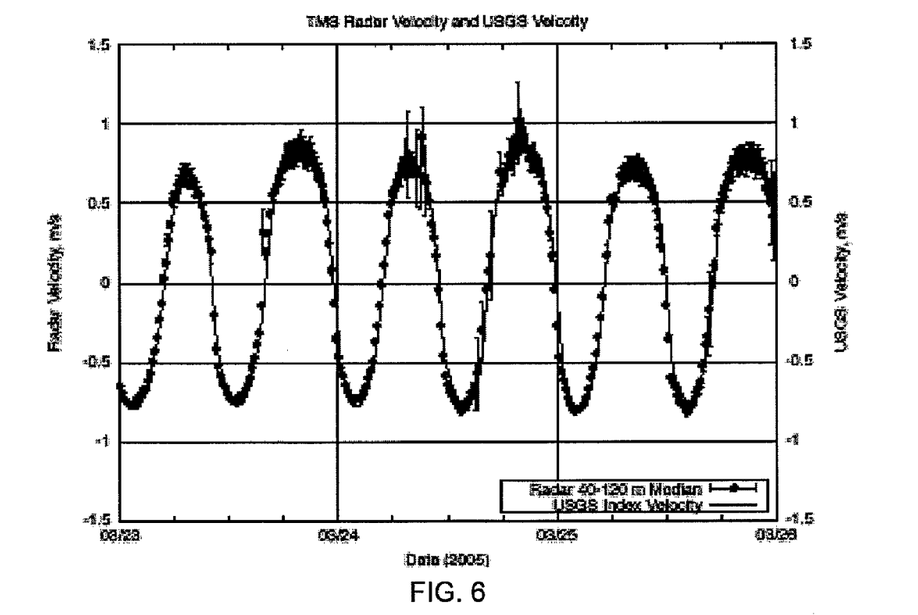
FIG. 6 is a graph of time history of radar velocity-inferred river flow as a function of time according to yet another embodiment of the present invention.

An example of average velocities from the UHF radar and an acoustic cross-river underwater velocity meter (UVM) is shown in FIG. 6. The UVM had been in place and used by the U.S. Geological Survey for several years at a location in California, and the velocity it measures had been successfully related to discharge by a rating curve. FIG. 6 shows that the UHF radar accurately reproduces the UVM velocity; in this case, the radar average surface velocity between 40 m and 120 m was used and compared. Also shown are the radar velocity error bars or uncertainties for each of the 15-minute measurement points. In this case, the channel connects the two largest rivers in the Sacramento Delta where the flow is tidal, accounting for the twice-daily reversals.

In one embodiment, at least some of the functions described herein are performed by a microprocessor or microprocessor-based device. The software, computer program logic, or code segments implementing various embodiments of the present invention may be stored in a computer readable medium of a computer program product. The term "computer readable medium" includes any medium that can store or transfer information. Examples of the computer program products include an electronic circuit, a semiconductor memory device, a ROM, a flash memory, an erasable ROM (EROM), a floppy diskette, a compact disk CD-ROM, an optical disk, a hard disk, and the like. Code segments may be downloaded via computer networks such as the Internet or the like.

Figure 7:
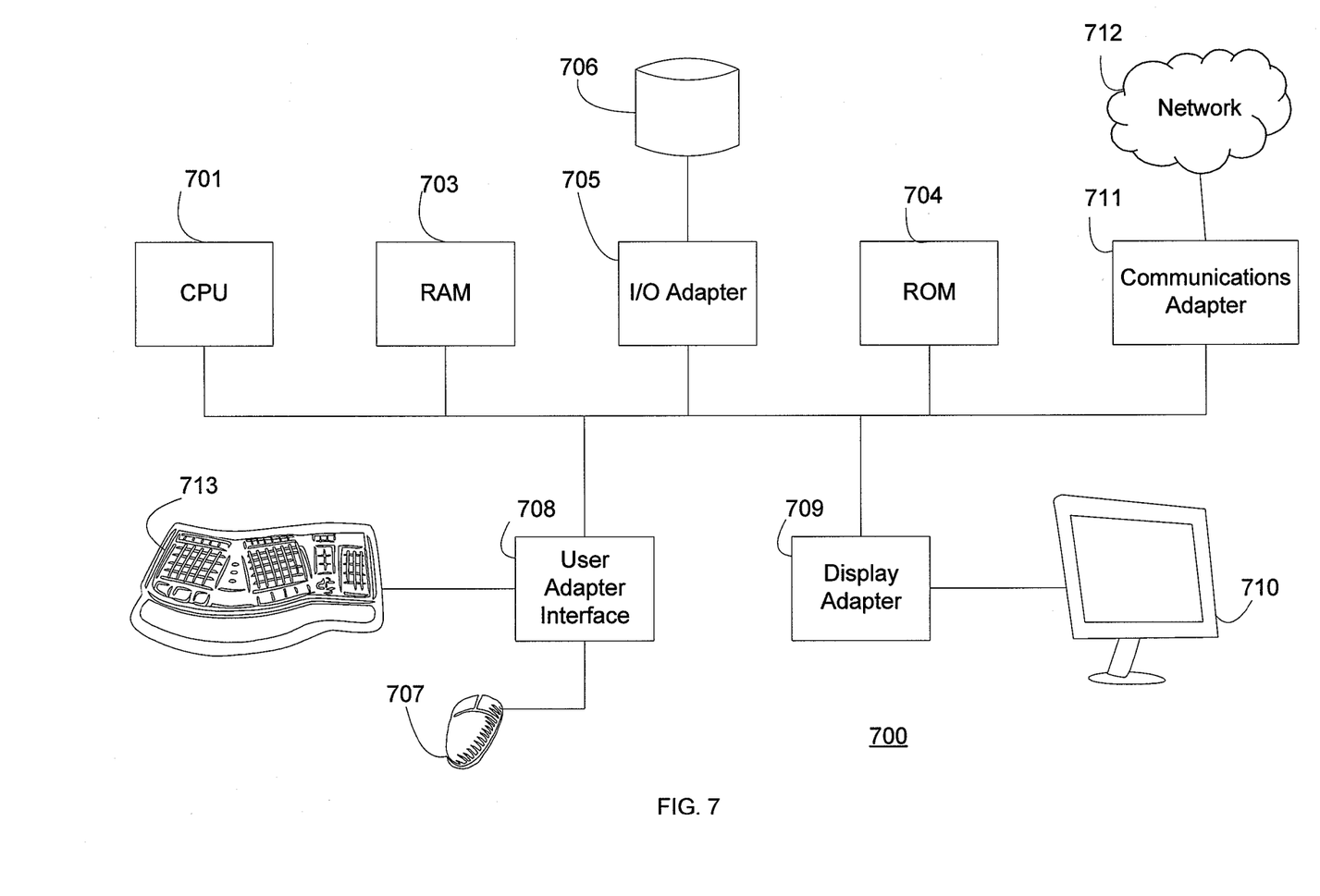
FIG. 7 is a block diagram of a computer system adapted to implement certain embodiments of the present invention.

FIG. 7 illustrates computer system 700 adapted to use embodiments of the present invention (e.g., storing and/or executing software associated with the embodiments). Central processing unit ("CPU") 701 is coupled to system bus 702. CPU 701 may be any general purpose CPU. However, embodiments of the present invention are not restricted by the architecture of CPU 701 as long as CPU 701 supports the inventive operations as described herein. Bus 702 is coupled to random access memory ("RAM") 703, which may be SRAM, DRAM, or SDRAM. ROM 704 is also coupled to bus 702, which may be PROM, EPROM, or EEPROM.

Bus 702 is also coupled to input/output ("I/O") controller card 705, communications adapter card 711, user interface card 708, and display card 709. I/O adapter card 705 connects storage devices 706, such as one or more of a hard drive, a CD drive, a floppy disk drive, a tape drive, to computer system 700. I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to network 712, which may be one or more of a telephone network, a local ("LAN") and/or a wide-area ("WAN") network, an Ethernet network, and/or the Internet. User interface card 708 couples user input devices, such as keyboard 713, pointing device 707, and the like, to computer system 700. Display card 709 is driven by CPU 701 to control the display on display device 710.

In one embodiment, the present invention advantageously scales frequencies used by HF radars to map ocean surface currents to the smaller distance and roughness scales found on rivers, thus exploiting the VHF/UHF frequency band. Preferably, the range of frequencies used by the systems described herein is approximately between 200 MHz and 3 GHz. As such, the present invention takes advantage of certain HF principles while overcoming a number of obstacles otherwise encountered at these higher frequencies.

In order to employ the highly accurate first-order Doppler relationship for water waves that applies at UHF (on rivers) but fails for microwave, one must deal with several challenges addressed by the present invention. For example, when river flow velocity is high (e.g., greater than 0.8 m/s), spectral regions from the advancing and receding water wave echoes overlap, i.e., become aliased. This poses a serious problem in extracting information unless some method for de-aliasing can be applied. As described in detail above, certain embodiments of the present invention resolve this aliasing problem.

Radial velocity maps of river surface flow may have hundreds of data points after direction finding is used to obtain bearing. This is unlike microwave radars that form narrow beams in only two directions. Hence, there is a wealth of data that is available with the UHF systems disclosed herein. However, these hundreds of radial velocities constitute a one-dimensional mapping of a two-dimensional total-velocity current-vector field. Thus, an appropriate model may be fit to this radial velocity field. The model represents the essence of flow that is required to estimate river volume discharge. The large wealth of radial velocity data points obtained using certain embodiments disclosed herein provides the creation models for flow that provide more than mere up/downriver flow. And, a described in detail above, certain embodiments of the present invention allow for the extraction of much more information than the simple two-beam concepts used in the prior art.

For very wide rivers or under calm conditions, the measured radial velocities may not span the river width. There are several reasons why the measured currents may not reach one or both banks. In these cases, a bank-to-bank profile of up/down-river velocity cannot be constructed. Prior art instruments that typically suffer this drawback include, for example, acoustic Doppler profilers (ADPs). In these cases, one may still obtain total volume discharge by constructing a "rating curve," i.e., by performing a controlled calibration at each radar location that relates discharge to some robust measure of the sensor data. Certain embodiments of the present invention provide rating-curve calibration techniques that lead to robust index methods for obtaining river discharge. In addition, the UHF radar systems disclosed herein are "non-contact," which means that they do not suffer from corrosion.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods, and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods, or steps.

REFERENCES

The following issued U.S. patents are hereby incorporated by reference: U.S. Pat. Nos. 6,862,922, 6,856,276, 6,844,849, 6,774,837, 6,586,748, 5,990,834, 5,361,072, and 4,172,255. The following patent applications are also hereby incorporated by reference: U.S. Patent Application Publication No. 2005/0007276 entitled "Circular Superdirective Receive Antenna Arrays" and filed Jul. 10, 2003, U.S. Patent Application Publication No. 2004/0090363 entitled "Ocean surface current mapping with bistatic HF radar" and filed Oct.

27, 2003, U.S. Patent Application Publication No. 2003/0213291 entitled "Radio wave measurement of surface roughness through electromagnetic boundary conditions" and filed May 17, 2002, U.S. Patent Application Publication No. 2003/0071751 entitled "Ocean surface current mapping with bistatic HF radar" and filed Dec. 19, 2001, U.S. Patent Application Publication No. 2003/0038744 entitled "Synthesis of total surface current vector maps by fitting normal modes to single-site HF radar data" and filed Apr. 1, 2002, and U.S. Patent Application Publication No. 2003/0025629 entitled "Multi-station HF FMCW radar frequency sharing with GPS time modulation multiplexing" and filed Mar. 28, 2002.

The invention claimed is:

1. A system for monitoring river flow parameters, the system comprising:
 a radar station having at least two antenna arrays located in operative relationship with a riverbank;
 at least one receive channel coupled to each antenna array;
 a direction finding module coupled to outputs of the at least one receive channel;
 a de-aliasing module coupled to the direction finding module; and
 a microprocessor,
 the system configured via instructions executed by the microprocessor to:
  convert broad beam-width data received from the antenna arrays to narrow bearing angle spacing data using direction finding module, in conjunction with the microprocessor,
  determine whether de-aliasing of the converted data is appropriate, and
  de-alias Doppler information present in the output of Doppler spectral versus bearing angle data, if determined appropriate.

2. The system of claim 1, wherein the radar station comprises three Yagi-Uda antenna arrays spaced approximately one-half wavelength apart, and wherein two end arrays are canted at about ±30° in bearing with respect to a center array.

3. The system of claim 1, wherein the radar station operates between approximately 200 MHz and 3 GHz.

4. The system of claim 1, wherein each receive channel is operable to downconvert, demodulate, digitize, and spectrum analyze signals received from the antenna array.

5. The system of claim 1, wherein a receive channel is operable to resolve a range from a scattering cell on a river surface and create a Doppler spectrum that relates frequencies to river velocity.

6. The system of claim 1 further comprising a stored pattern database operable to provide predicted amplitude and phase patterns for use in bearing calculations to convert the broad beam width data received from the antenna arrays to narrow bearing angle spacing data.

7. The system of claim 6, wherein the system is configured to determine a least squares best fit of radial velocity data vs. bearing to a cross-river profile of surface velocity in the downriver direction.

8. The system of claim 1, further comprising a switch coupled to at least one element of an antenna array for pulsing and gating transmitted and received signals.

9. The system of claim 1, further comprising a rating curve database coupled to the indexing block and operable to store a pre-calibrated rating curve.

10. The system of claim 1, further comprising a depth-averaged module coupled to the profiling module and operable to calculate a depth-averaged flow at one or more points across the river.

11. The system of claim 10, further comprising a river data database coupled to the depth-averaged module and operable to store river data used to calculate a cross sectional area of water across the river.

12. A method for determining river flow parameters, the method comprising:
 receiving broad beam width data from a radar station comprising a antenna arrays with a broad beamwidth, the radar station located in operative relationship with a riverbank;
 pre-processing the received broad beam width data;
 converting the broad beam width data to narrow bearing angle spacing data;
 assessing either the received broad beam width data or the converted narrow bearing angle spacing data and determining if the flow rate is above an aliasing threshold;
 applying a de-aliasing algorithm to the converted narrow bearing angle spacing data if the flow rate is above the threshold; and
 performing at least one of the following steps:
  calculating a profile of downriver surface flow as a function of distance across a river; and
  employing a subset of surface velocities measured by the radar station to estimate a river discharge.

13. The method of claim 12, wherein the radar station operates between approximately 200 MHz and 3 GHz.

14. The method of claim 12, wherein the pre-processing the received data comprises downconverting, demodulating, digitizing, and spectrum analyzing the received data.

15. The method of claim 14, wherein the spectrum analyzing comprises resolving a range from a scattering cell on a river surface and creating a Doppler spectrum that relates frequencies to river velocity.

16. The method of claim 12, further comprising a calculating a depth-averaged flow at one or more points across the river to determine a river discharge using the profile of downriver surface flow.

17. A computer readable medium having a computer program recorded thereon that causes a computer to perform the steps of:
 receiving broad beam width data from a radar station comprising an antenna array with a broad beam width, the radar station located in operative relationship with a riverbank;
 pre-processing the received broad beam width data;
 converting the broad beam width data to narrow bearing angle spacing data;
 assessing either the received broad beam width data or the converted narrow bearing angle spacing data and determining if the flow rate is above an aliasing threshold;
 applying a de-aliasing algorithm to the converted narrow bearing angle spacing data if the flow rate is above the threshold; and
 at least one of:
  calculating a profile of downriver surface flow as a function of distance across a river; and
  employing a subset of surface velocities measured by the radar station to estimate a river discharge.

18. The computer readable medium of claim 17, wherein the computer program further causes the computer to calculate a depth-averaged flow at one or more points across the river to determine a river discharge using the profile of downriver surface flow.

* * * * *